G. E. VANDERBURGH.

Treating Alkalies.

No. 1,674. Reissued May 17, 1864.

Witnesses:

Lemuel W. Serrell

Chas. A. Smith

Inventor:

George E. Vanderburgh.

UNITED STATES PATENT OFFICE.

GEORGE E. VAN DERBURGH, OF MAMARONECK, ASSIGNOR, BY MESNE ASSIGNMENTS, TO NEW YORK QUARTZ COMPANY, OF NEW YORK, N. Y.

IMPROVED MODE OF REDUCING SILICATES TO A LIQUID OR GELATINOUS STATE.

Specification forming part of Letters Patent No. 28,640, dated May 29, 1860; Reissue No. 1,297, dated April 1, 1862; Reissue No. 1,674, dated May 17, 1864.

DIVISION A.

*To all whom it may concern:*

Be it known that I, GEORGE E. VAN DERBURGH, of Mamaroneck, in the county of Westchester and State of New York, have invented a new and improved method of reducing silicious substances to a liquid or gelatinous state, by which I am enabled at a small expense to produce a liquid silicate containing over eighty per cent. of silex; and I do hereby declare that the following is a full, clear, and exact description of the said invention, reference being had to the accompanying drawings, forming a part of this specification.

The first step in my process is to chemically incorporate any desired proportion of some alkaline base with the silicious substance that is to be operated upon, and then, after grinding the composition thus produced, I bring it into direct contact with superheated steam while inclosed within a suitable vessel, which process, in a very short time, reduces the said composition to a liquid or gelatinous state.

The apparatus employed in my improved process may be of any suitable style and character, provided the same be made sufficiently strong, and provided the digesting portion thereof be so arranged that the silicious and alkaline composition placed therein can be retained, while in an undissolved state, in the upper portion of the digesting-chamber, or be submitted alternately to the action of a liquid contained in the lower portion of said digester and of superheated steam admitted into the upper portion of the same.

Figure 1:
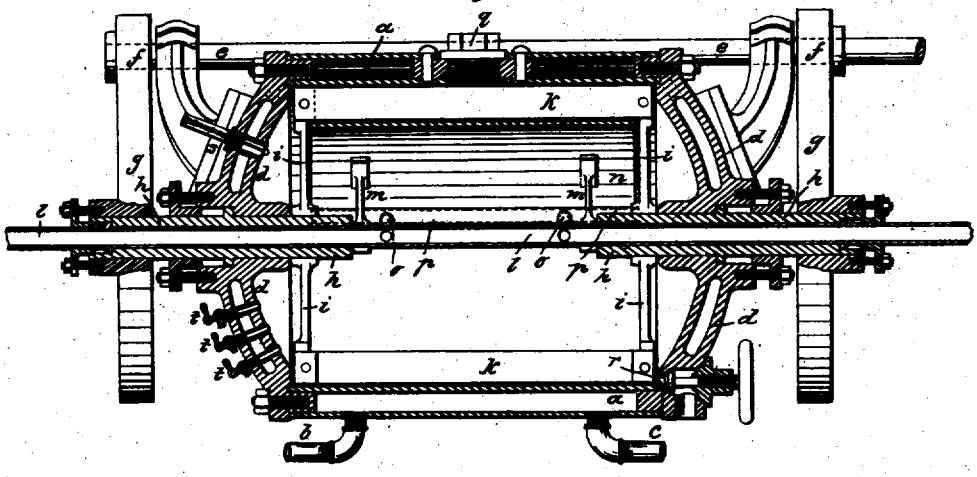
Figure 2:
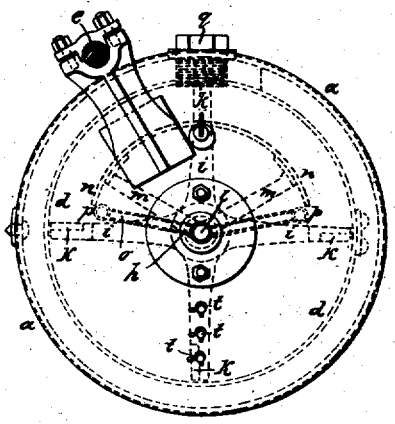

In the accompanying drawings, Figure 1 is a section, and Fig. 2 an end view, of a digesting-chamber, which may be advantageously employed as a portion of the apparatus for carrying out my said invention.

This digesting-chamber is of a cylindrical shape and may be constructed with double sides *a a* and double heads *d d* combined with each other in any suitable manner. The heads *d d* of said chamber are centrally perforated for the reception of the short hollow shafts *h h*, which work in packing-boxes within said perforations. The pipe *l*, which conducts the superheated steam into the digester, passes through the shafts *h h* and the joints between the said pipe and shafts are rendered steam-tight by means of any suitable packing. The hollow shafts *h h* have radial arms upon their inner ends, which are connected to elevators *k k* within the digester, that extend the entire length of the same, and the outer edges of which are brought nearly in contact with the inner casing of the digester. Arms *m m* from the main steam-pipe *l* support the curved shield *n*, and radial hollow arms *o o* from the said steam-pipe *l* support the slitted longitudinal steam-pipes *p p*, which conduct the superheated steam into the digester. The proportions of the above-mentioned parts are such that the elevators *k k* can revolve freely around the shield *n* and the slitted steam-pipes *p p*. Motion is imparted to the elevators *k k* by means of the toothed wheels *g g* on the shaft *h* and the pinions *f f* on the driving-shaft *e*. The said digester is provided with a man-hole and with other suitable valve-closed openings, and also with an instrument for indicating the temperature within the same. *q* is the man-hole stopper; *r*, the valve that closes the aperture through which the silicate is withdrawn from the digester; *t t*, the try-cocks, and *s s* the instrument for indicating the temperature within the digester.

Steam is admitted into the spaces between the double heads and double sides of the digester for the purpose of preventing the condensation of the superheated steam which is introduced into the inner chamber. Suitable pipes are provided for drawing off the water produced by the condensation of this protecting body of steam.

In the production of a liquid silicate by this my improved process, the silicious substance employed is usually clean sand, and for an alkaline base commercial potash, ash, or soda may advantageously be employed; but silicious stones may be substituted for the sand, the same being first reduced to a powder by any suitable disintegrating process.

The proportions of the silicious and alkaline substances composing the composition which I reduce to a liquid or gelatinous state as above-described may be varied as circumstances require.

The uses of the liquid silicate produced by my said improved process, and the advantages arising from such use, are so numerous that I will not attempt here to name them all. I will, however, state that some varieties of such liquid silicate may with advantage be used in the following ways and for the purposes stated: First, as a coating for the surfaces of blocks of stone for the purpose of rendering them impervious to the action of water and acids; second, for saturating planks and all kinds of timber, and articles of wood, ship bottoms, the interior of barrels, &c., for the purpose of rendering them water and fire proof; third, by incorporating with such liquid silicate any suitable grinding, gritty, or polishing materials—such as sand, disintegrated emery, quartz, spar, pomace, flint, &c.—a paste will be produced capable of being compactly molded into a millstone, polishing-wheel, whetstone, hone, scythe-rifle, or other similar articles, and the articles thus produced will be superior in quality to those produced from any natural stone; fourth, as the cementing ingredient in the production of pudding stone, sandstone, and other artificial stones; fifth, as an ingredient in the production fire proof paints, instead of oil; sixth, as an ingredient in the production of a water-proof coating composition for roofs, cellars, basements, vaults, sewers, pavements, &c.; seventh, as an ingredient in the production of a water-proof cement for use in the building of brick and stone-walls; eighth, for the purpose of producing fire-proof theatrical scenery by first saturating the canvas with said article and then painting it with silicated paint; ninth, for the purpose of rendering cloths and clothing water-proof and nearly fire-proof by saturating such articles with the liquid silicate; tenth, for producing a thin transparent water-proof coating upon statuary, paintings, walls, furniture, metals, &c.; eleventh, as a substitute for starch in the laundry and in millinery establishments, and for size in all manufacturing operations, and especially in the production of water-proof and fire-proof roofing-paper, card-boards, &c.; twelth, as an ingredient in the production of soap; thirteenth, as a protecting coating for hams, eggs, fruits, vegetables, &c.; fourteenth, for saturating the soles of boots and shoes, thereby rendering them water-proof and more durable; fifteenth, when brought to a proper consistency the said liquid silicate forms a cement of great power and whose adhesiveness is not impaired by either moisture or heat, and which may be employed for uniting surfaces of wood, glass, porcelain or potter's ware, and also in the preparation of sand-paper, emery-paper, glass-paper, franklinite, files, &c., and it may take the place of glue and all other cements in every branch of the arts.

What I claim as my invention, and desire to secure by Letters-Patent, is—

Reducing any disintegrated silicious substance to a liquid or gelatinous state by bringing into direct contact with superheated steam, while inclosed within a suitable vessel, substantially as herein set forth.

Signed this 16th day of April, 1864.

GEORGE E. VAN DERBURGH.

In presence of—

GEO. A. MAYHEW,
CHAS. DRAKE.